United States Patent [19]
Klein

[11] Patent Number: 4,712,696
[45] Date of Patent: Dec. 15, 1987

[54] KNOCKDOWN STORAGE RACK WITH WEDGE CONNECTORS

[75] Inventor: Herbert H. Klein, Arlington Heights, Ill.

[73] Assignee: Unarco Industries, Inc., Chicago, Ill.

[21] Appl. No.: 4,336

[22] Filed: Jan. 15, 1987

[51] Int. Cl.$^4$ ............................................. A47B 47/00
[52] U.S. Cl. .................................. 211/192; 211/183; 403/233; 403/254
[58] Field of Search .................. 211/183, 182, 192; 248/222.2, 231.9, 301; 403/233, 235, 237, 254

[56] References Cited

U.S. PATENT DOCUMENTS

| | | |
|---|---|---|
| Re. 24,535 | 9/1958 | Franks . |
| 2,760,650 | 8/1956 | Franks . |
| 2,815,130 | 12/1957 | Franks . |
| 3,490,604 | 1/1970 | Klein . |
| 3,637,086 | 1/1972 | Klein . |
| 4,421,239 | 12/1983 | Vargo ............................ 211/192 X |

*Primary Examiner*—Ramon S. Britts
*Assistant Examiner*—Blair M. Johnson
*Attorney, Agent, or Firm*—Clement and Ryan

[57] ABSTRACT

A wedge connector for securing the horizontal cross beams of a storage rack to the hollow upright posts of the system. Two ear-supporting members extend laterally from an elongated shank, each of which members carries an upwardly extending welding ear. The wedge connector has a shape and carefully controlled dimensions that make it possible to insert the elongated shank and upper wedging ear into the lower slot of a pair of elongated slots in the upright post of the storage rack. The elongated shank is then pivoted up within the interior of the hollow post into a position where the upper wedging ear can be moved back out of the upper elongated slot of the pair of slots, to place the wedge connector in its operative position. The dimensions of the lower wedging ear of the wedge connector are controlled so that the lower ear can not be inserted in the lower elongated slot in the upright post. The features described produce the advantage of being able to insert the wedge connector from outside a hollow, completely enclosed tubular upright post, while at the same time retaining the advantage of locating the elongated shank on the inside of the post when the connector has been placed in its final operative position.

18 Claims, 11 Drawing Figures

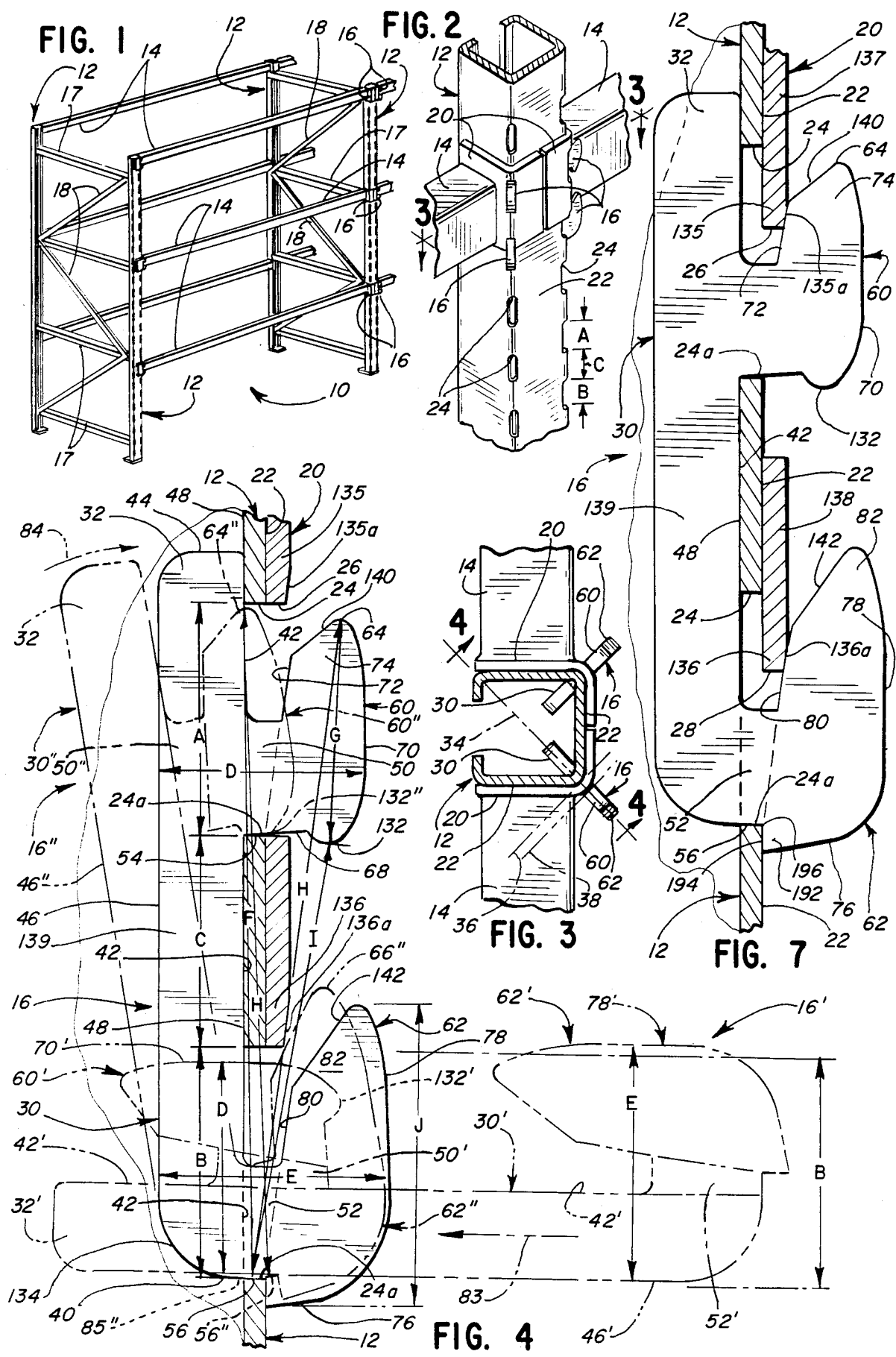

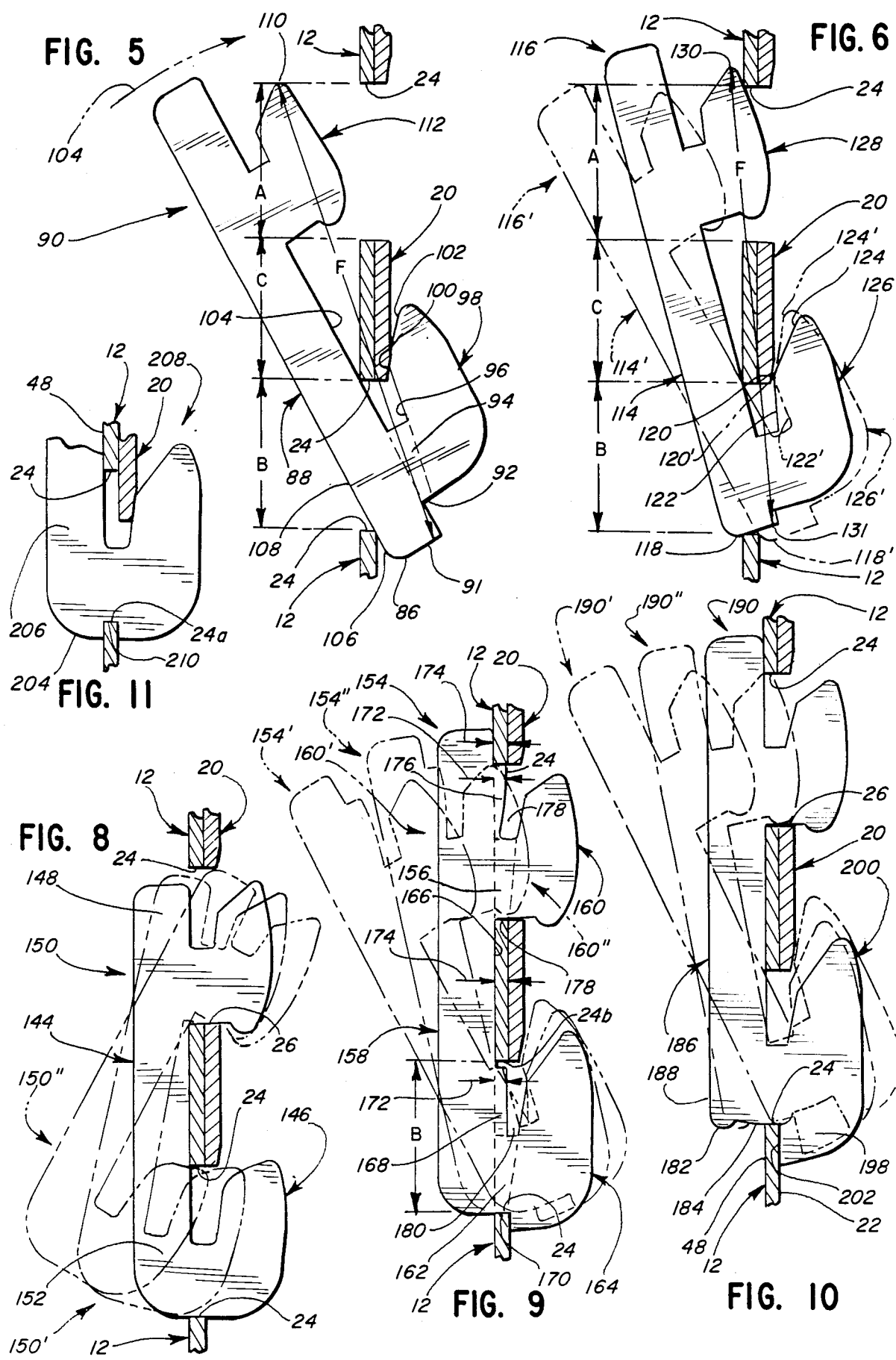

KNOCKDOWN STORAGE RACK WITH WEDGE CONNECTORS

FIELD OF THE INVENTION

This invention relates to a wedge connector for use with knockdown storage racks, and more particularly a wedge connector to secure the horizontal cross beams of such a rack to the hollow upright posts of the system.

BACKGROUND OF THE INVENTION

Knockdown racks having slotted hollow upright posts to which horizontal cross beams are secured by wedge connectors have been widely used for storage shelving and pallet racks. Structures of this type are shown in U.S. Pat. Nos. 2,760,650 to Franks, 2,815,130 to Franks, 3,490,604 to Klein, 3,637,086 to Klein, and 4,421,239 to Vargo.

The wedge connector of the first three and the fifth of these patents is inserted from inside the hollow upright post to secure the horizontal cross beams to the posts, and the wedge connector of the fourth patent is inserted from outside the post. Each of the wedge connectors referred to is formed of a flat, elongated shank with two wedging ears extending laterally from the shank. In the case of the first three and fifth patents, the elongated shank is located within the inside of the hollow upright post when the knockdown rack is assembled, and in the case of the fourth patent the elongated shank is located outside the hollow post when the rack is assembled.

The advantage of positioning the elongated shank portion of the wedge connector within the inside of the upright post, as in the first three and fifth patents referred to, is that the force exerted by the inner edge of the shank against the inside wall of the upright post can be distributed over a relatively large area. However, it is not possible with these wedge connectors to use a completely closed hollow post, since as explained above the connector must be inserted from inside the post.

The advantage to the connector disclosed and claimed in the fourth patent under discussion is that it can be used with a completely enclosed hollow post. However, the portions of the wedge connector that press against the wall of the hollow post abut that wall over a smaller area than with the other four connectors, and it does not have a single, continuous shank portion (supplemented by a second, smaller portion) in contact with the post, as is the case in the other four patents, but instead has three distinct smaller abutment portions making that contact.

The wedge connector of the present invention unexpectedly makes it possible to achieve the advantages of both these types of wedge connectors, without either of the accompanying disadvantages. First, with this wedge connector a large central portion of the elongated shank member, supplemented in the preferred embodiment by a smaller upper portion of the shank, is positioned against the inside wall of the hollow upright post. Second, because of the unique configuration of this wedge connector, it is possible to insert it, quickly and easily, from outside a completely enclosed hollow post.

SUMMARY OF THE INVENTION

The wedge connector of the present invention is used with a knockdown storage rack that includes a hollow upright post having at least one pair of vertically aligned, vertically oriented, spaced elongated slots in the wall of the post. The upper one of the slots of the pair has a first predetermined length, the lower one of the slots has a second predetermined length, and the two slots of the pair are spaced apart vertically a third predetermined distance.

In a typical storage rack, the elongated slots described comprise a series of slots, in two adjacent corners of a hollow post, extending substantially throughout the entire height of the post. In a widely used rack of this type, the elongated slots are substantially identical and are equally spaced, with the first, second and third dimensions just referred to all being equal. The post may be wholly enclosed or it may have a C-shaped or U-shaped cross section, as desired.

The storage rack further includes a horizontal cross beam that terminates in a support plate (typically in the form of a corner angle) that is matingly related to the exterior surface of the hollow upright post. This cross beam support plate defines a vertically oriented elongated slot of substantially the same shape and dimensions as the upper elongated post slot in the above described pair of post slots. The bottom edge of this vertical elongated slot in the cross beam support plate is spaced above the bottom edge of the support plate a distance equal to the third predetermined distance mentioned above.

The wedge connector of this invention includes a flat, elongated shank of a length to span the lower elongated post slot of the pair of slots, the portion of the post wall lying between the two slots, and at least a portion of the upper post slot. The shank preferably also spans the entire upper post slot, and in addition extends upward a distance above that slot.

The median plane of the shank is perpendicular to the planes tangent to the respective surfaces of the upright post wall and the mating cross beam support plate, in the area adjacent the elongated slots in the post and support plate, when the wedge connector is installed in its operative position. Preferably at least the inner edge of the shank, which abuts the inner surface of the post wall when the wedge connector is in its operative position, is straight.

Two ear-supporting members extend laterally from the inner edge of the elongated shank, and a wedging ear is supported by each of these laterally extending members. These ear-supporting members are disposed one above the other when the wedge connector is installed in its operative position in the rack.

The shape and dimensions of the upper wedging ear are such that the upper end portion of the wedge connector, with the wedging ears pointed upward and the longitudinal axis of the elongated shank generally perpendicular to the lower elongated post slot, can be inserted from outside the post into that lower slot. In addition, the shape, dimensions, and relationship to the elongated shank of the lower wedging ear are such that the lower end portion of the wedge connector can not pass through the lower post slot at the time the upper end portion of the connector is inserted in the post, and preferably can not do so either after the connector is pivoted upward as will be described below.

The upper end portion of the elongated shank is pivotable within the lower elongated post slot upward about the lower portion of the shank, after the shank has been inserted in that slot, to bring the highest point on the upper edge of the upper wedging ear to a position just within the upper elongated post slot.

Two other limitations make it possible to pass the upper wedging ear out through the upper post slot after the wedge connector has been inserted in the lower post slot and pivoted upward about its lower end portion to present the upper ear to the upper post slot. First, the shape, dimensions and location on the elongated shank of the upper ear are such that the highest point on the upper edge of the upper ear continues to fall below the top edge of the upper post slot when the upper portion of the wedge connector is pivoted farther beyond the position in which the upper ear lies just within the upper post slot. Second, the shape and dimensions of the upper ear are such that it can pass through the upper post slot when the wedge connector pivots as described about its lower end portion.

In the embodiment of this invention illustrated herein, the inner and outer edges of the flat, elongated shank of the wedge connector are both straight and are parallel to each other, and the structural limitations specified above are met by the following dimensional limitations:

1. The distance between (a) the bottom edge of the upper laterally extending ear-supporting member and (b) the bottom edge of the lower ear-supporting member is preferably substantially equal to the above mentioned second predetermined length plus the third predetermined distance, or in other words the distance between the bottom edges of the two post slots into which these ear-supporting members are inserted when the wedge connector is in place in the rack.

2. The maximum distance, measured perpendicularly to the inner edge of the shank, from the outer side edge of the wedging ear carried by the upper supporting member, across that ear and its associated laterally extending support member, and then across the shank to the outer edge of the shank, is less (preferably slightly less) than the length of the lower elongated slot in the hollow upright post (the second predetermined length referred to above).

3. The maximum distance measured similarly for the wedging ear carried by the lower laterally extending support member is greater (preferably only slightly greater) than the length of the lower elongated slot in the upright post (the second predetermined length mentioned above).

4. The maximum distance between the upper and bottom edges of the upper ear is less (preferably slightly less) than the length of the upper elongated slot in the post (the first predetermined length).

5. The distance between (a) the highest point on the upper edge of the upper wedging ear and (b) the bottom edge of the lower ear-supporting member is less (preferably slightly less) than the above mentioned first predetermined length, plus the second predetermined length, plus the third predetermined distance that represents the spacing between the pair of slots in the post.

6. The distance between (a) the highest point on the upper edge of the upper wedging ear and (b) the portion of the bottom edge of the elongated shank that is adjacent the bottom edge of the lower ear-supporting member meets the same limitation as expressed in paragraph 5 just above.

In addition to the structural limitations described above, the inner edge of each of the wedging ears is inclined away from the connector shank in the upward direction towards the free end of the ear, with the bottom portion of that inner edge being spaced from the inner edge of the shank a distance less than the combined thickness of the cross beam support plate and the wall of the post. This provides a wedging surface to confine both (a) the portion of the cross beam support plate that lies immediately above the elongated slot in the plate, and (b) the portion of the support plate that lies immediately above the bottom edge of the plate, when the support plate slot is aligned with the upper post slot, the upper wedging ear is inserted throuqh he lower post slot, the upoer ear is swung up in a circular path until it passes through the upper post slot and the support plate slot, and the support plate is moved downward.

The construction described above means that when the support plate is brought into position to be secured to the upright hollow post, portions of the support plate above the confined portions just mentioned will be urged against the outer surface of the wall of the upright post, and the inner edge of the elongated shank will be urged against the inner surface of the post wall, to connect the support plate and its associated cross beam securely to the upright post.

Various other features to be explained below are included in specific forms of this invention.

A more detailed explanation of the invention is provided in the following description and claims, and is illustrated in the accompanying drawing.

BRIEF DESCRIPTION OF THE DRAWING

FIG. 1 is a perspective view of a portion of a storage rack includes the wedge connector of this invention;

FIG. 2, an enlarged, fragmentary perspective view of the 1 portion of the storage rack shown in FIG. 1;

FIG. 3 a fragmentary sectional view, taken along line 3—3 in FIG. 2, of the wedge connector of this invention installed in place in the assembled rack;

FIG. along line 4—4 in FIG. 3, is a further enlarged, sectional view of a portion of the wall of an upright post, and a portion of the support plate of a cross beam matingly engaged with the post but not yet lowered into its final position where it is supported by the wedge connector of this invention, said Figure showing in phantom successive positions taken by the wedge connector as it is initially inserted in a hollow upright post from outside the post, and then pivoted upward within the interior of the post, with the final operative position of the wedge connector being shown in full lines immediately after the upper wedging ear has passed through the aligned elongated slots in the post wall and cross beam support plate engaged therewith;

FIG. 5 cross-sectional view similar to FIG. 4 but on a reduced scale, showing how extending the bottom portion of the elongated shank of the wedge connector of this invention would render the connector inoperative;

FIG. 6 is a similar view showing how a less extended bottom portion of the elongated shank of the connector would still, require an adjustment in the height of the upper wedging ear;

FIG. 7 is a cross-sectional view similar to FIG. 4 of the connector of the latter Figure (without the phantom showing of successive positions taken by the wedge connector as it is inserted and pivoted in the post) after the cross beam support plate has been moved down into engagement with the wedging ears of the connector FIG. 8 is a cross-sectional view similar to FIG. 4 but reduced scale, showing how lowering the top edge of the elongated shank of the wedge connector of this invention can under certain circumstances make the connector somewhat less stable;

FIG. 9 is a cross-sectional view similar to FIG. 4, again on a somewhat reduced scale, showing an alternative embodiment of the wedge connector of this invention;

FIG. 10 is a view similar to FIG. 9 showing another embodiment of the wedge connector of this invention; and FIG. 11 is a fragmentary view similar to the bottom portion of FIG. 10 showing another embodiment of the wedge connector of this invention.

DETAILED DESCRIPTION OF ILLUSTRATIVE EMBODIMENTS

General Construction Of Rack

FIG. 1 is a perspective view of a portion of a storage rack 10 having four hollow upright posts 12 to which horizontal cross beams 14 are secured by wedge connectors 16 formed according to this invention. Short horizontal braces 17 and diagonal braces 18—all welded together and to upright posts 12 as shown—complete this portion of one embodiment of a rack with which the wedge connector of this invention can be used.

In FIG. 2, which is an enlarged, fragmentary perspective view of the lower right-hand portion of storage rack 10 shown in FIG. 1, support plates 20 at the ends of cross beams 14 are connected to upright post 12 through wedge connectors 16. Each cross beam 14 terminates in a support plate 20 that is matingly related to the exterior surface 22 of post 12. Support plate 20, as is the case in the storage rack illustrated in FIGS. 1 and 2, is typically in the form of a corner angle.

To receive wedge connectors 16, hollow upright post 12 has at the two near corners a vertically aligned series of vertically oriented slots that in this embodiment are substantially identical, equally spaced slots 24. The wedge connector of this invention is designed to be used with a pair of immediately adjacent slots 24.

The upper slot of any given pair of elongated slots 24 with which wedge connector 16 may be used has a first predetermined length A. The lower slot of the pair has a second predetermined length B. The third predetermined distance between the two slots of the pair is designated in the drawing as distance C. In the rack illustrated, predetermined lengths A and B and predetermined distance C, as is typically the case, are all equal to each other.

As best seen in FIG. 4, each cross beam support plate 20 defines a vertically oriented elongated slot 26 to match upper slot 24 in a given pair of slots in post 12. Because slot 26 matches upper slot 24, it also has first predetermined length A. Bottom edge 26a of vertical elongated slot 26 is spaced above bottom edge 28 of cross beam support plate 20 a distance equal to third predetermined distance C.

General Configuration Of Wedge Connector

The general configuration of the wedge connector of this invention will now be described by reference to FIGS. 3 and 4.

Flat, Elongated Shank

In the embodiment shown, flat, elongated shank 30 is sufficiently long to span two elongated slots 24 in post 12 and the portion of the post wall lying between those two slots, and to extend (at portion 32) above the upper one of slots 24. The extension of elongated shank 30 above upper post slot 24 serves two purposes. First, it increases the contact area between inner edge 42 of shank 30 and interior surface 48 of the wall of upright post 12. Second, as will be explained in more detail below, it prevents the upper portion of shank 30 from pivoting forward through upper post slot 24 and thereby increasing the risk, if lower wedging ear 62 is for some reason too short from its lower to its upper edge, that that ear may slip through lower post slot 24 into the interior of hollow post 12.

As seen in FIG. 3, median plane 34—34 of elongated shank 30 of wedge connector 16 is perpendicular to planes 36—36 and 38—38, which are tangent to exterior surface 22 of the wall of hollow upright post 12 and the exterior wall of mating support plate 20 of cross beam 14, respectively, in the area adjacent post slots 24 and support plate slot 26, respectively, when wedge connector 16 is installed in its operative position.

As illustrated in FIG. 4, elongated shank 30 has a bottom edge 40, an inner edge 42, an upper edge 44, and an outer edge 46. Preferably at least inner edge 42, which abuts inner surface 48 of the wall of upright post wall 12 when wedge connector 16 is in its operative position, is straight. Outer edge 46 of shank 30 is remote from post 12 when the wedge connector is in its operative position. In the embodiment shown and described herein, outer edge 46 is also straight, and is parallel to inner edge 42 of the shank.

Ear-Supporting Laterally Extending Members

Ear-supporting member 50 extends laterally from the upper portion of straight inner edge 42 of elongated shank 30, and ear-supporting member 52 extends laterally from the lower portion of inner edge 42. Each of these members 50 and 52 is associated with one of a pair of vertical elongated slots 24 of upright post 12. Ear-supporting members 50 and 52 are disposed one above the other when the wedge connector is installed in its operative position in the storage rack.

The distance between bottom edge 54 of upper ear-supporting member 50 and bottom edge 56 of lower ear-supporting member 52 is preferably substantially equal to the distance between bottom edges 24a of post slots 24 with which members 50 and 52 are associated, or in other words second predetermined length B plus third predetermined distance C. If the distance between bottom edges 54 and 56 is more or less than the indicated distance, only one of members 50 and 52 will be supported by a bottom edge of a post slot 24.

In the embodiment of FIG. 4, bottom edge 40 of elongated shank 30 extends no lower than bottom edge 24a of lower ear-supporting member 52

Wedging Ears

Wedging ear 60 is supported by upper laterally extending member 50, and wedging ear 62 is supported by lower laterally extending member 52. Free end 64 of wedging ear 60 and free end 66 of wedging ear 62 are directed upward when wedge connector 16 is installed in its operative position in the storage rack.

Ear 60 has a bottom edge 68, an outer side edge 70, upper edge 64, and inner edge 72, the latter being adjacent upper portion 74 of ear 60. Lower ear 62 has similar edges 76, 78, 66 and 80, the latter being located adjacent upper portion 82 of ear 62.

Insertion Of Wedge Connector

The manner of insertion of wedge connector 16 in vertical elongated slots 24 of the wall of upright post 12 can be seen from the respective outlines of connectors 16' and 16" that are drawn in phantom in FIG. 4.

As there seen, the shape and dimensions of upper ear 60' are such that the upper end portion of wedge connector 16' can be inserted from outside post 12 into lower elongated slot 24 of upright post 12, with wedging ears 60' and 62' pointed upward and the longitudinal axis of elongated shank 30' generally perpendicular to lower slot 24. Maximum distance D, measured perpendicularly to inner edge 42' of elongated shank 30', from outer side edge 70' of upper wedging ear 60', across ear 60' and its associated ear-supporting member 50', and then across shank 30' to outer edge 46' of shank 30', is less than second predetermined length B of lower slot 24. (Maximum distance D is preferably only slightly less than the indicated value, in order to keep wedging ear 60 as strong as possible.) This dimension permits the upper portion of shank 30' to be inserted in lower elongated slot 24 in the manner described along direction 83, from right to left in FIG. 4.

At the same time, the shape and dimensions of lower wedging ear 62' are such that the lower end portion of wedge connector 16' can not pass through lower post slot 24 when the upper end portion of the connector is being inserted in that slot as just described. Maximum distance E, measured perpendicularly to inner edge 42' of the shank, from outer side edge 78', across wedging ear 62' and its associated laterally extending support member 52', and then across shank 30' to outer edge 46' of the shank, is greater than second predetermined length B of lower slot 24. (Maximum distance E is preferably only slightly greater than the indicated value, in order to limit the amount of material necessary for the manufacture of wedge connector 16' while at the same time keeping wedging ear 62' of strong construction.) This prevents ear 62' and the bottom portion of wedge connector 16' from passing through lower slot 24.

The shape and dimensions of the lower portion of elongated shank 30' and the shape, dimensions and location on the shank of wedging ears 60' and 62' are such that after the upper wedging ear has been inserted in lower elongated post slot 24 while cross beam support plate 20 is matingly engaged with the wall of post 12, and upper post slot 24 and support plate slot 26 are aligned with each other (as in FIG. 4), the upper end portion of shank 30' is pivotable within lower post slot 24 upward about the lower end portion of the shank, along a curved path in clockwise direction 84, to the position shown in phantom in the upper part of FIG. 4. In this position, the highest point on upper edge 64" of upper wedging ear 60" is just within upper elongated slot 24 in the post wall. Pivoting in this manner is made possible because distance F between upper edge 64" of upper wedging ear 60" and portion 85" of the bottom edge of elongated shank 30" which lies adjacent bottom edge 56" of the lower ear-supporting member is less than first predetermined length A, plus second predetermined length B, plus third predetermined distance C.

The importance of the distance just described from upper edge 64" to portion 85" of the bottom edge of elongated shank 30" in FIG. 4 will be seen from a comparison of that Figure with FIGS. 5 and 6. FIG. 5 shows an assumed shape for a wedge connector that could not be used in the practice of the present invention because lower edge 86 of elongated shank 88 of connector 90 extends too far downward at portion 91 adjacent bottom edge 92 of lower wedging ear-supporting member 94, and FIG. 6 shows a further modified wedge connector that is still not usable with this invention.

As one skilled in the art will understand, and as seen from FIG. 5, the combined thickness of wall 12 and cross beam support plate 20, together with the distance that support plate 20 must drop when it nests against wedging surface 96 of lower wedging ear 98, determines the position and inclination that surface 96 must have. The position of corner 100 on the inner edge of ear 98 is then determined by the position selected in the design of the wedge connector for upper portion 102 of that inner edge. These structural features just described determine how far the upper portion of wedge connector 90 can be rotated in clockwise direction 104 before further movement in that direction is restricted by the striking of inner edge 104 of the connector and lower portion 106 of outer edge 108 of the connector against the upper and lower edges, respectively, of elongated post slot 24.

As will be seen, even if the lower outside corner of shank 88 that is formed by its bottom edge 86 and its outer edge 108 were completely cut away, portion 91 of shank bottom edge 86 would still interfere with moving the highest point on upper edge 110 of upper wedging ear 112 to a position just within upper elongated slot 24 in post hole 12. The reason for this, as shown in FIG. 5, is the fact that distance F between upper edge 110 of upper wedging ear 112 and the bottom edge of portion 41 of shank bottom edge 86 is greater than the sum of first and second predetermined lengths A and B plus third predetermined distance C.

As seen in FIG. 6, even if the bottom end portion of elongated shank 114 of connector 116 was shortened from the construction shown in FIG. 5 to bring shank bottom edge 118 to a location where the interaction between edge 118 and corner 120 formed by wedging surface 122 and upper inclined surface 124 of lower wedging ear 126 does not interfere with bringing upper wedging ear 128 into contact with the top edge of upper post slot 24, the highest point on upper edge 130 of wedging ear 128 still can not be moved to a position just within upper elongated slot 24 in wall 12. Although the shape and dimensions of elongated shank 114 and the shape, dimensions, and location on shank 114 of lower wedging ear 126 have permitted upper wedging ear 128 to move from position 116' shown in phantom and come into contact with post wall 12, the shape and dimensions of the lower portion of shank 114 prevent the pivoting that is essential to the practice of the present invention because distance F between upper edge 130 of upper wedging ear 128 and portion 131 of shank bottom edge 118 does not have a value that is less than the sum of first and second predetermined lengths A and B plus third predetermined distance C.

While it is not possible to specify with precision all the dimensions of the wedge connector of this invention that will permit the pivoting of the elongated shank in the manner necessary for the practice of the invention, any person skilled in the art can see from the present disclosure the various ways in which the shape and dimensions of the lower portion of the elongated shank and the shape, dimensions, and location on the shank of the two wedging ears can be adjusted to make that pivoting possible with a given connector.

Returning now to FIG. 4, the shape, dimensions, and location on elongated shank 30" of upper wedging ear 60" are such that the highest point on upper edge 64" of ear 60" falls below the top edge of upper elongated post slot 24 when the upper end portion of wedge connector 16" has been pivoted about its lower end portion, as described above, to a position just within upper elongated post slot 24. Then, as wedge connector 16" pivots farther in clockwise direction 84 from the position shown in phantom in FIG. 4, upper wedging ear 60 can be moved forward and passed entirely through slot 24 from inside upright post 12, and thereafter moved still farther through aligned elongated slot 26 in cross beam support plate 20. This is possible because the shape, dimensions, and location on elongated shank 30" of upper wedging ear 60" are such that the highest point on upper edge 64" of ear 60" continues to fall below the top edge of upper elongated post slot 24 when the upper end portion of wedge connector 16" is pivoted farther beyond the position shown in phantom in FIG. 4.

As wedging ear 60 moves into the full line position shown at the right-hand side of FIG. 4, the lower portion of elongated shank 30 and wedging ear 62 which is supported by it move to the left, which brings bottom edge 56 of ear-supporting member 52 into register with bottom 24a of lower elongated slot 24 in post wall 12.

The final movement of wedge connector 16 into its operative position as just described is possible because of two dimensions. First, distance G between the highest point on upper edge 64 and the lowest point on bottom edge 68 of wedging ear 60, including downwardly extending protuberance 132 adjacent outer side edge 70 of ear 60, is less than first predetermined length A. (Distance G is preferably only slightly less than the indicated value, in order to extend upper portion 74 of wedging ear 60 as high as possible and still stay within the prescribed maximum limit.) Second, maximum distance H between the highest point on upper edge 64 of upper wedging ear 60 and bottom edge 56 of lower ear-supporting member 52 must be less than first predetermined length A, plus second predetermined length B, plus third predetermined distance C. (Maximum distance H is preferably only slightly less than the indicated value, again in order to extend upper portion 74 of wedging ear 60 as high as possible while meeting the prescribed maximum limit.) This distance H is shown in FIG. 4 both for the wedge connector in its position in which upper wedging ear 60" is just within upper elongated slot 24 (the position shown in phantom) and in its final operative position with upper wedging ear 60 fully inserted in upper slot 24 (the position shown in full lines).

At least the portion of bottom edge 40 of elongated shank 30 that lies adjacent inner edge 42 of the shank is preferably rounded so as to facilitate pivoting of the shank, after it has been inserted in lower elongated slot 24 in the wall of post 12, up and around to a position where upper ear 60 can pass, as just described, through upper slot 24 in the wall of post 12, and from there through aligned elongated slot 26 in support plate 20. In the embodiment shown in FIG. 4, the entire corner 134 formed by bottom edge 40 and outer edge 46 of elongated shank 30 is rounded off.

To further facilitate the passage of ear 60 through upper slot 24 of post 12, bottom edge 54 of laterally extending ear-supporting member 50 carrying upper ear 60, as well as bottom edge 68 of that upper ear itself, both slant slightly upward in the direction away from elongated shank 30 towards outer side edge 70 of upper ear 60.

As explained above, lower wedging ear 62 is sufficiently larger than upper wedging ear 60 in its demension transverse to the longitudinal axis of the wedge connector that the lower ear can not pass through lower post elongated slot 24 when the wedge connector is first inserted in the post. Another reason why the lower wedging ear is preferably larger than the upper wedging ear, in both the transverse and longitudinal directions, is to make it easier to grasp the wedge connector to perform the pivoting action described above that is carried out after the upper wedging ear has been inserted through lower elongated slot 24 of post wall 12.

FIG. 7 shows wedge connector 16 in its operative position after cross beam support plate 20 has been moved down, from the position shown in FIG. 4, against wedging surface 72 of upper wedging ear 60 and wedging surface 80 of lower wedging ear 62. With cross beam support plate 20 in this position, it is secured to the wall of upright post 12 by the wedging action of connector 16 that is now to be described.

Wedging Action Of Ears

Inner edges 72 and 80 of wedging ears 60 and 62, respectively, are inclined away from shank 30 in the upward direction towards the respective free end of each ear. The bottom portion of each of inner edges 72 and 80 is spaced from inner edge 42 of shank 30 a distance less than the combined thickness of cross beam support plate 20 and the wall of upright post 12.

With this configuration, inner edge 72 of upper ear 60 provides a wedging surface to confine portion 135 of cross beam support plate 20, which lies immediately above elongated slot 26 in that plate. Similarly, inner edge 80 of lower ear 62 provides a wedging surface to confine portion 136 of support plate 20, which lies immediately above bottom edge 28 of the plate. Support plate portions 135 and 136 are slightly beveled at 135a and 136a, respectively, to receive the inner edges of the corresponding wedging ears.

From this description and the showing in FIG. 7, it will be seen that when cross beam support plate 20 is brought into position to be secured to upright post 12, with wedge connector 16 in its operative position, support plate portions 137 and 138, which lie above support plate portions 135 and 136, respectively, will be urged against the exterior surface 22 of the wall of upright post 12. At the same time, inner straight edge 42 of shank 30 will be urged, at both upper portion 32 and midportion 139 of the shank, against inner surface 48 of the wall of upright post 12. As a consequence, support plate 20 and its associated cross beam 14 will be connected securely to post 12.

To facilitate the seating of portions 86 and 88 of support plate 20 against wedging surfaces 72 and 80 of ears 60 and 62, respectively, as described just above, these two ears are provided with second inclined surfaces 140 and 142, on the uppermost portion of the inner edge of each ear. These second inclined surfaces are inclined at a greater angle than wedging surfaces 72 and 80, in order to make free ends 74 and 82 of the two ears narrower and thereby provide a larger space to receive the respective portions of support plate 20 of cross beam 14 as the beam is lowered into place against upright post 12.

Safety Features

The above mentioned downwardly extending protuberance 132 on bottom edge 68 of upper wedging ear 60 assists in keeping wedge connector 16 seated in its operative position even if horizontal cross brace 14 and its support plate 20 are knocked up out of contact with the wedging ears by an accidental blow struck, for example, by a forklift truck that is being operated nearby. As seen in FIGS. 4 and 7, downwardly extending protuberance 132 is located adjacent outer side edge 70 of upper ear 60.

If wedge connector 16 is jostled in some way to move upper wedging ear 60 to the left in FIG. 4 or FIG. 7, protuberance 132 will assist in keeping the wedge connector in place, by catching on bottom edge 24a of upper elongated vertical slot 24 in the wall of upright post 12. This safety feature will be enhanced if distance I (seen in FIG. 4) between the lowest point on protuberance 132 to bottom edge 56 of lower ear-supporting member 52 is slightly less than second predetermined length B plus third predetermined distance C. Distance I should be as much less than the indicated value as is possible and still permit upper edge 64 of wedging ear 60 to pass through aligned cross beam support plate slot 26 and upper elongated post slot 24 as ear 60 is swung around in the counterclockwise direction when it is desired to remove it from those slots.

As mentioned above, the extension of upper portion 32 of elongated shank 30 above upper post slot 24 reduces the risk that the orientation of the wedge connector could somehow be varied so that lower wedging ear 62 might slip through lower post slot 24 into the interior of hollow post 12. As seen in FIG. 8, if elongated shank 144 does not extend high enough, and if the vertical dimension of lower wedging ear 146 from its bottom edge to its top edge is also not great enough, upper end portion 148 of elongated shank 150 can pivot (in the clockwise direction in this Figure) about its lower end portion 152, and ear 146 can then slip out (as shown in successive positions drawn in phantom) through lower elongated slot 24 in the wall of upright post 12 into the interior of the post.

To help make sure that this can not happen, in addition to providing upwardly extending portion 32 of elongated shank 30, the shape, dimensions, and location on shank 30 of lower wedging ear 62 in FIG. 4 are preferably such that the lower end portion of the wedge connector is blocked from passing through lower elongated post slot 24 during the above described upward pivoting of the connector and the insertion of upper wedging ear 60 in upper post slot 24. To insure this, distance J between the highest point on upper edge 66 of lower wedging ear 62 and the lowest point on bottom edge 76 of lower ear 62 should be larger, as is the case in FIG. 4, than second predetermined length B of lower elongated post slot 24. For increased safety, distance J is preferably very substantially greater than length B.

Extending wedging ear 62 upward in this way will also make the seating of cross beam support plate 20 within the space defined by wedging surface 80 of ear 62 more secure and, as already indicated, will make it easier for the user of the connector to grasp lower wedging ear 62 during the upward pivoting of the wedge connector.

FIG. 9 illustrates an alternative embodiment 154 of the wedge connector of this invention that includes another safety feature, which will help to resist any upward displacement of the wedge connector as a whole. In this embodiment, ear-supporting member 156 extends laterally from elongated shank 158 to support upper wedging ear 160, and member 162 extends laterally from shank 158 to support lower wedging ear 164.

The lower portion of inner edge 166 of elongated shank 158 carries step 168 that (1) extends above bottom edge 170 of lower ear-supporting member 162 a distance slightly less than second predetermined length B of lower elongaged slot 24 in upright post 12, and (2) extends outward towards wedging ear 164 a distance 172 that is slightly less than thickness 174 of the wall of upright post 12. As will be seen from FIG. 9, if wedge connector 154 is forced upward by an upwardly directed blow (accidentally applied, for example, by a fork lift truck), the upper edge of step 168 will strike the upper edge 24b of lower elongated slot 24 in post 12, thus resisting displacement of the wedge connector from its operative position. If desired, a similar step can be carried by inner edge 166 of elongated shank 158 in the upper portion of wedge connector 154, where it will perform much the same function as step 168 does in the lower portion of the wedge connector.

In order to avoid requiring the punch press on which wedge connector 154 is typically produced to punch out too narrow an opening at the inner edge of the wedging ear (which would increase the risk of damage to the male portion of the die), the steps just described can be replaced by steps of a different configuration, such as, for example, member 176 at the upper end of elongated shank 158. Step 176 extends outward from inner edge 166 of elongated shank 158 to the same extent that step 168 extends in the lower portion of the wedge connector, and upward from bottom end 178 of ear-supporting member 156 very slightly less than first predetermined length A of upper elongated slot 24. However, as will be seen from FIG. 8, because of the particular configuration of step 176, space 178 between upper wedging ear 160 and elongated shank 158 is wider than space 180 adjacent lower wedging ear 164.

The phantom outlines in FIG. 9 show successive positions 154' and 154" of wedge connector 154 after it has been inserted in lower elongated post slot 24, and its upper end portion has been pivoted upward about its lower end portion in order to bring upper wedging ear 160 just within upper elongated slot 24.

FIG. 10 illustrates an additional safety feature that may be included in the wedge connector of this invention, if desired, in the form of protuberance 182, which extends downward from bottom edge 184 of elongated shank 186 adjacent outer edge 188 of the elongated shank. As will be seen from the full line showing in this Figure, if an accidental blow to wedge connector 190 tends to displace the lower portion of the connector to the right, protuberance 182 will strike inner surface 48 of the wall of upright post 12, which will resist any removal of the lower portion of the wedge connector to the right from lower post slot 24. The phantom outlines 190' and 190" show successive positions taken by the wedge connector as the insertion of the connector within upright post 12 and aligned elongated slots 24 and 26 is carried out.

Additional Strength In Wedge Connector

As best seen in FIG. 7, wedge connector portion 192 at the bottom of lower wedging ear 62 extends below bottom edge 56 of laterally extending ear-supporting member 52, with inner edge 194 of bottom portion 192 forming substantially a right angle with edge 56 of member 52. As shown, with the proper relationship accurately maintained between wedging surface 80 of ear 62 and edge 194 of protuberance 192, edge 194 will abut exterior surface 22 of the wall of upright post 12 when the wedge connector is in its operative position supporting horizontal cross beam 14.

Wedging ear 62 will in every case oppose the force applied by support plate 20 in a direction perpendicular to wedging surface 80, and it is believed that ear 62 will provide additional strength in the connection of support plate 20 to post 12 because it will be backed up, by the abutment of edge 194 of protuberance 192 against post 12, in its opposition to the clockwise-directed moment of force that is exerted against wedging surface 80 on ear 62 by the perpendicular force from support plate 20 acting about fulcrum 196 located at bottom edge 24a of lower elongated slot 24 in upright post 12. The abutting contact between edge 194 of protuberance 192 and outer surface 22 of the wall of post 12 will be emphasized and increased as the load on horizontal cross beam 14 is increased.

If desired, as indicated in FIG. 10, protuberance 198 extending downward from lower wedging ear 200 can be increased in size in comparison with protuberance 192 in FIG. 7, thus increasing the area of abutment between edge 202 of protuberance 198 and outer surface 22 of the upright post 12. In this Figure, successive positions 190' and 190" of wedge connector 190 as the upper end portion of the connector is pivoted upward are shown in phantom.

If it is desired to increase the contact area between the elongated shank of the wedge connector and interior surface 48 of the wall of upright post 12, the shank can be modified as illustrated in FIG. 11, which is a fragmentary cross-sectional view similar to a portion of FIG. 7. As shown in FIG. 11, bottom edge 204 of elongated shank 206 can be lowered so that when wedge connector 208 is in its operative position, edge 204 will extend below bottom edge 24a of lower elongated post slot 24. This will produce downwardly opening notch 210, which has a rectangular cross section and will embrace the portion of the post wall that lies immediately below lower post slot 24. With this construction of the lower portion of the wedge connector, the highest point on the upper wedging ear will of course have to be lowered, in order to provide the necessary clearance between that upper ear and the top edge of upper elongated slot 24 of post 12 when the upper ear is pivoted up and forward, to be inserted in upper slot 24 from behind the post wall.

The above detailed description has been given for ease of understanding only. No unnecessary limitations are to be understood therefrom, as modifications will be obvious to those skilled in the art.

I claim:

1. A wedge connector in combination with a knockdown storage rack that includes a hollow, upright, post having an inside, an outside and at least one pair of vertically aligned, vertically oriented, spaced, elongated slots in the wall of said post, the upper slot of said pair having a first predetermined length, the lower one having a second predetermined length, the two slots of said pair being spaced apart vertically a third predetermined distance, said rack further including a horizontal cross beam that terminates in a support plate matingly related to the exterior surface of said post, said support plate defining a vertically oriented elongated slot of substantially the same shape and dimensions as said upper elongated slot in said post wall, the bottom edge of said vertical elongated slot in said cross beam support plate being spaced above the bottom edge of the support plate a distance equal to said third predetermined distance, which wedge connector comprises:

(a) a flat, elongated shank spanning said lower post slot, the portion of the post wall lying between said two post slots, and at least a portion of the upper one of said two post slots, the median plane of said shank being perpendicular to the respective planes tangent to the surfaces of the wall of said hollow post and of said mating support plate in the area adjacent said elongated slots in said post and said support plate, said elongated shank having a width, a bottom edge, an inner edge, an upper edge and an outer edge, the inner edge of said shank abutting the inner surface of said post wall, and the outer edge of said shank being remote from said post wall;

(b) two ear-supporting members extending laterally from said inner edge of said elongated shank, one for each slot of said pair of post slots, said ear-supporting members being disposed one above the other; and (c) a wedging ear supported by each of said laterally extending members, said two ears being disposed one above the other, with a free end of each of said ears being directed upward, each of said ears having a bottom edge, an outer side edge, an upper edge located at the free end of the ear, and an inner edge adjacent the upper portion of said ear, the lateral dimension of said connector adjacent the upper end thereof, comprising the widths of said shank, said upper ear-supporting member and said upper ear, being slightly less than said second predetermined length of said lower post slot such that said upper end of said wedge connector, with said wedging ears pointed upward and the longitudinal axis of said elongated shank generally perpendicular to the lower one of said two elongated post slots, is inserted from outside the post into said lower post slot, the lateral dimension of said connector adjacent the lower end therof, comprising the widths of said shank, said lower ear-supporting member and said lower ear, being slightly more than said second predetermined length of said lower post slot such that said lower end of said wedge connector can not pass through said lower elongated post slot during said upper end portion of said wedge connector into said lower post slot the shape and dimensions of the lower portion of said elongated shank and the shape, dimensions, and location on said shank of said two wedging ears being such that, after said upper wedging ear has been inserted in said lower elongated post slot while said cross beam support plate is matingly engaged with said post wall and said upper post slot and said support plate slot are aligned with each other, the upper end portion of said elongated shank is pivoted within said lower elongated post slot upward about the lower end portion of said shank and the highest point on said upper edge of said upper wedging ear is moved to a position just within said upper elongated slot in said post wall, the shape, dimensions, and location on said elongated shank of said upper wedging ear being such that the highest point on said upper edge of said wedging ear continues to fall below the top edge of said upper elongated post slot as said upper end portion of the wedge connector is pivoted farther beyond the position in which said upper ear lies just within said upper post slot, the shape and dimensions of said upper wedging ear being such that said ear passes, after the wedge connector has been pivoted as just described, entirely through said aligned slots in said post wall and said cross beam support plate, said inner edge of each of said upper and lower wedging ears having a first inclined surface that is inclined away from said shank in the upward direction towards the free end of the ear, with the bottom portion of said inner edge of the ear being spaced from said inner edge of said shank a distance less than the combined thickness of said cross beam support plate and the wall of said post, to provide a wedging surface to confine (i) the portion of said support plate that lies immediately above said elongated slot in said plate, and (ii) the portion of said support plate that lies immediately above said bottom edge of the plate, respectively, when said support plate slot is aligned with said upper post slot, said upper wedging ear is inserted in the lower elongated post slots and pivoted as aforesaid to pass the upper wedging ear through said aligned slots, and the support plate is moved downward, whereby portions of said support plate above the confined portions just mentioned are urged against the outer surface of the wall of said upright post, and said inner edge of said shank is urged against the inner surface of the wall of said upright post, thereby connecting said support plate and its associated cross beam securely to the post.

2. The wedge connector of claim 1 in which the shape, dimensions, and location on said elongated shank of said lower wedging ear are such that the lower end portion of said wedge connector can not pass through said lower elongated post slot during and after the aforesaid upward pivoting of the upper end portion of said elongated shank and insertion of said upper wedging ear in said upper elongated post slot.

3. The wedge connector of claim 2 in which the distance between the highest point on said upper edge of said lower wedging ear and the lowest point on said bottom edge of said lower ear, measured parallel to said inner edge of said elongated shank, is larger than said second predetermined length of said lower elongated post slot.

4. The wedge connector of claim 1 in which said elongated shank also spans said entire upper post slot and extends upward a distance above said slot, when said wedge connector is in place in its operative position securing said support plate to said hollow upright post.

5. The wedge connector of claim 1 in which at least the portion of the bottom edge of said elongated shank that lies adjacent said inner edge of said shank is upwardly rounded in the direction away from said inner edge towards said outer edge of the shank, so as to facilitate the aforesaid pivoting of the elongated shank, after said upper wedging ear has been inserted in the lower one of said pair of elongated slots in the post wall, up around to a position where said upper ear can pass through the upper elongated post slot and through said elongated slot in said supporting plate.

6. The wedge connector of claim 1 in which the bottom edge of said laterally extending member carrying said upper wedging ear and the bottom edge of said upper wedging ear both slant slightly upward in the direction away from said elongated shank towards said outer side edge of said upper ear.

7. The wedge connector of claim 1 in which said bottom edge of said upper wedging ear includes a downwardly extending protuberance adjacent said outer side edge of said ear.

8. The wedge connector of claim 7 in which the distance from the lowest point on said protuberance to the bottom edge of the lower ear-supporting laterally extending member is slightly less than said second predetermined length plus said third predetermined distance.

9. The wedge connector of claim 1 in which the bottom portion of the lower one of said wedging ears extends below the bottom edge of said laterally extending ear-supporting member carrying said lower ear, with the inner edge of said bottom portion forming substantially a right angle with said bottom edge, to provide a protuberance to abut the outer surface of the wall of the upright post when the wedge connector is in its operative position supporting said cross beam.

10. The wedge connector of claim 1 in which a second inclined surface on the uppermost portion of the inner edge of each of said wedging ears is inclined at a greater angle than the wedging surface heretofore described, to narrow the free end of the ear and to provide a larger space to receive the respective portions of the cross beam support plate as the beam is lowered into place against the upright post.

11. The wedge connector of claim 1 in which the lower portion of said inner edge of said shank carries a step that extends (a) above said bottom edge of said lower ear-supporting member a distance slightly less than said second predetermined length, and (b) outward towards said lower wedging ear a distance slightly less than the thickness of the wall of said upright post.

12. The wedge connector of claim 1 in which the upper portion of said inner edge of said shank carries a step that extends (a) above said bottom edge of said upper ear-supporting member a distance slightly less than said first predetermined length, and (b) outward towards said upper wedging ear a distance slightly less than the thickness of the wall of said upright post.

13. The wedge connector of claim 1 in which the bottom edge of said elongated shank extends no lower than the bottom edge of said lower ear-supporting member.

14. The wedge connector of claim 1 in which said bottom edge of said elongated shank includes a downwardly extending protuberance adjacent said outer edge of said shank.

15. The wedge connector of claim 1 in which the distance between the highest point on said upper edge of said upper wedging ear and the portion of said bottom edge of said elongated shank lying adjacent the bottom edge of said laterally extending member carrying said lower wedging ear is slightly less than said first predetermined length plus said second predetermined length plus said third predetermined distance.

16. The wedge connector of claim 1 in which the distance between the highest point on said upper edge of said upper wedging ear and the bottom edge of said laterally extending member carrying said lower wedging ear is slightly less than said first predetermined length plus said second predetermined length plus said third predetermined distance.

17. The wedge connector of claim 1 in which the distance between the highest point on said upper edge of said upper wedging ear and the lowest point on the bottom edge of said upper ear, measured generally parallel to said inner edge of said elongated shank, is less than said first predetermined length of said upper elongated post slot.

18. A wedge connector in combination with a knockdown storage rack that includes a hollow, upright post having an inside, and outside and at least one pair of vertically aligned, vertically oriented, elongated slots in the wall of said post, one of the slots of said pair having a first predetermined length, the lower one having a second predetermined length, the two slots of said pair being spaced apart vertically a third predetermined distance, said rack further including a horizontal cross beam that terminates in a support plate matingly related to the exterior surface of said post, said support plate defining a vertically oriented elongated slot of substantially the same shape and dimensions as said upper elongated slot in said post wall, the bottom edge of said vertical elongated slot in said cross beam support plate being spaced above the bottom edge of the support plate a distance equal to said third predetermined distance, which wedge connector comprises:

(a) a flat, elongated shank spanning both of said elongated post slots and the portion of the post wall lying between said two post slots, and to extend a distance above the upper one of said slots, the median plane of said shank being perpendicular to the respective planes tangent to the surfaces of the wall of said hollow post and of said mating support plate in the area adjacent said elongated slots in said post and said support plate, said elongated shank having a bottom edge, a straight inner edge, an upper edge and an outer edge, the straight inner edge of said shank abutting the inner surface of said post wall, and the outer edge of said shank being remote from said post wall;

the corner formed by the intersection of the bottom and rear edges of said elongated shank being upwardly rounded in the direction away from said inner edge towards said outer edge of the shank, so as to facilitate pivoting of the elongated shank, after the upper portion of said shank has been inserted in the lower one of said pair of elongated slots in the post wall, up around to a position where the upper portion of said shank is adjacent the upper one of said pair of elongated slots in the post;

(b) two ear-supporting members extending laterally from said straight inner edge of said elongated shank, one for each slot of said pair of post slots, said ear-supporting members being disposed one above the other, the distance between the bottom edge of the upper one of said laterally extending supporting members and the bottom edge of the lower one of said supporting members being substantially equal to said second predetermined length plus said third predetermined distance; and (c) a wedging ear supported by each of said laterally extending members, said two ears being disposed one above the other, with a free end of each of said ears being directed upward, each of said ears having a bottom edge, an outer side edge, an upper edge located at the free end of the ear, and an inner edge adjacent the upper portion of said ear, the maximum distance, measured at right angles to said inner edge of said elongated shank, from said outer side edge of said upper wedging ear to said outer edge of said elongated shank being less than said second predetermined post slot length, the maximum distance, measured at right angles to said inner edge of said elongated shank, from said outer side edge of said lower wedging ear to said outer edge of said elongated shank being greater than said second predetermined length, the shape and dimensions of the lower portion of said elongated shank and the shape, dimensions, and location on said shank of said two wedging ears being such that after said upper wedging ear has been inserted in said lower elongated post slot while said cross beam support plate is matingly engaged with said post wall and said upper post slot and said support plate slot are aligned with each other, the upper end portion of said elongated shank is pivoted within said lower elongated post slot upward about the lower end portion of said shank thereby moving the highest point on said upper edge of said upper wedging ear to a position just within said upper elongated slot in said post wall, the shape, dimensions, and location on said elongated shank of said upper wedging ear being such that the highest point on said upper edge of said wedging ear continues to fall below the top edge of said upper elongated post slot when said upper end portion of the wedge connector is pivoted farther beyond the position in which said upper ear lies just within said upper post slot, the shape and dimensions of said upper wedging ear being such that said ear passes, after the wedge connector has been pivoted as just described, entirely through said aligned slots in said post wall and said cross beam support plate, the bottom edge of the upper one of said laterally extending members and the bottom edge of said upper wedging ear both slanting slightly upward in the direction away from said elongated shank towards said outer side edge of said upper ear, said bottom edge of said upper wedging ear including a downwardly extending protuberance adjacent said outer side edge of said ear, the distance from the bottom edge of said protuberance to the bottom edge of the lower ear-supporting laterally extending member being slightly less than said second predetermined length plus said third predetermined distance, the bottom portion of the lower one of said wedging ears extending below the bottom edge of said laterally extending ear-supporting member carrying said lower ear, with the inner edge of said bottom portion forming substantially a right angle with said bottom edge, providing a protuberance to abut the outer surface of the wall of the upright post, the distance between the highest point on said upper edge of said lower wedging ear and the lowest point on said bottom edge of said lower ear, measured parallel to said inner edge of said elongated shank, being larger than said second predetermined length of said lower elongated post slot, said inner edge of each of said upper and lower wedging ears having a first inclined surface that is inclined away from said shank in the upper direction towards the free end of the ear, with the bottom portion of said inner edge of the ear being spaced from said inner edge of said shank a distance less than the combined thickness of said cross beam support plate and the wall of said post, providing a wedging surface to confine (i) the portion of said support plate that lies immediately above said elongated slot in said plate, and (ii) the portion of said support plate that lies immediately above said bottom edge of the plate, respectively, when said support plate slot is aligned with said upper post slot, said upper wedging ear is inserted in the lower elongated slot and pivoted as aforesaid to pass the upper wedging ear through said aligned slots, and the support plate is moved downward, a second inclined surface being provided on the uppermost portion of the inner edge of each of said wedging ears, said second surface being inclined at a greater angle than the wedging surface heretofore described, to narrow the free end of the ear and to provide a larger space to receive the respective portions of the cross beam support plate as the beam is lowered into place against the upright post, whereby portions of said support plate above the confined portions just mentioned are urged against the outer surface of the wall of said upright post, and said inner edge of said shank is urged against the inner surface of the wall of said upright post, thereby connecting said support plate and its associated cross beam securely to the post.

* * * * *